Feb. 28, 1961    E. ORSHANSKY, JR    2,972,865
FLUID PRESSURE TAKE-UP
Filed May 11, 1959

INVENTOR.
Elias Orshansky, Jr.
BY Rodney Bedell
atty.

United States Patent Office 2,972,865
Patented Feb. 28, 1961

2,972,865

FLUID PRESSURE TAKE-UP

Elias Orshansky, Jr., New York, N.Y., assignor to Chicago Railway Equipment Company, Chicago, Ill., a corporation of Illinois Filed May 11, 1959, Ser. No. 812,497

8 Claims. (Cl. 60—54.5)

The invention relates to an automatic take-up for fluid pressure operated mechanisms such as hydraulic brake slack adjusters. The taking up of linkage slack and the moving of other brake parts into functioning position result in some lost motion even when the mechanism is new. This lost motion increases with use and wear.

The main object of the present invention is to minimize lost motion movement of the operating cylinder and piston throughout the useful life of the mechanism involved.

Another object of the invention is to avoid drifting or fluttering of a piston compensating valve in a slack adjuster of the type described.

Another object of the invention is to combine power mechanism and slack adjuster in a self-contained unit and to avoid the use of a separate mounting for a slack adjuster unit, additional piping and connections and the necessary clearances for mounting such unit, piping and connections as may be required to cooperate with the power mechanism.

Figure 1:
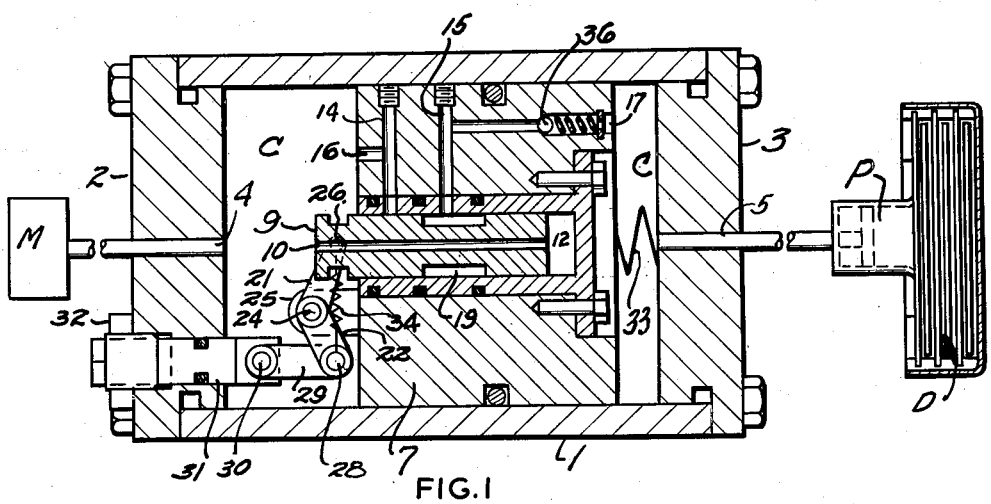

In the accompanying drawings illustrating a selected embodiment of the invention:

Figure 1 is a longitudinal section through a cylinder and piston structure embodying the take-up. A source of pressure fluid and a brake to which pressure fluid is applied shown diagrammatically. The figure shows the device with the brake released.

Figure 2:
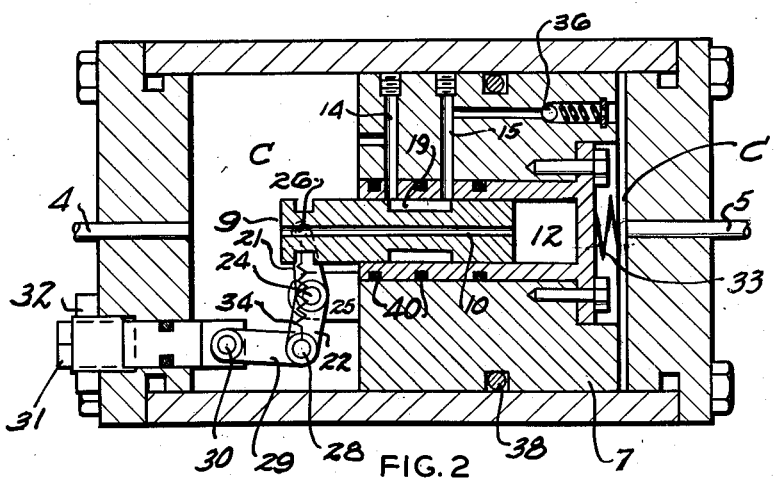

Figure 2 is a similar section showing the device with the brake applied.

The device comprises essentially a cylinder and a piston having a through passage to opposite ends of the piston, a valve in the piston for opening and closing the passage and means for actuating the valve at or near predetermined points in the travel of the piston in the cylinder. The cylinder has a side wall 1 and end walls 2 and 3. End wall 2 has an inlet 4 for pressure fluid leading from a source of fluid supply such as a master cylinder M. End wall 3 has an outlet 5 for pressure fluid to be delivered to the operating cylinder P of a brake which may include a plurality of stationary and rotating disks D as described, for example, in an earlier application filed by applicant April 24, 1957, Serial No. 654,865. A piston 7 is movable in the cylinder and is provided with a plunger 9 movable lengthwise of the piston and having a through bore 10 from end to end. The plunger chamber 12 in the piston is connected by laterals 14, 15 and ports 16, 17 to the interior of the cylinder at opposite ends of the piston respectively. Elements 14, 15, 16, 17 constitute a through passage from one end of the piston adjacent inlet 4 to the other end of the piston adjacent outlet 5. Plunger 9 includes a peripheral channel 19 long enough to connect laterals 14, 15 (Figure 2) but when the plunger is moved a substantial distance in either direction from the position shown in Figure 2, laterals 14, 15 are sealed from each other and the passage through the piston is closed.

The relative position of the plunger and piston is controlled by a snap-action device comprising an over-center toggle-like arrangement having arms 21, 22 independently rotatable upon a pivot pin 24 seated in a bracket 25 projecting from the piston. The outer end of toggle arm 21 is pivotally connected at 26 to the end of plunger 9. The outer end of toggle arm 22 is connected by a pin 28 to a link 29 which is pinned at 30 to an anchor 31 adjustably mounted in cylinder wall 2 and locked in secured desired position by lock nut 32.

A tension spring 34 is connected to the swinging portions of toggle arms 21, 22 and tends to thrust them toward each other at opposite sides of the axis of pivot pin 24 according to the relation between pin 24 and pin 28 as determined by the movement of the piston in the cylinder.

It will be understood that the master cylinder, inlet 4, piston chambers C, outlet 5 and operating cylinder P are filled with fluid such as oil or a hydraulic brake fluid, but chambers C are not in communication with each other when the take-up parts are in the normal position indicated in Figure 1. Upon application of pressure through inlet 4, piston 7 is moved to the right to transmit the pressure through the fluid to operating brake cylinder P. When pressure on the master cylinder is released, the piston is returned to its normal position by the excess of pressure in right hand chamber C over pressure in left hand chamber C which may be supplemented by release spring 33 and springs in the brake cylinder or between the brake disks. Normally the piston is reciprocated during successive brake operations without other functioning of the take-up parts, but after repeated brake applications and wear upon the brake disks or leakage of fluid beyond the right hand end of the piston, the piston may move to a more extreme position, as indicated in Figure 2, which will cause pin 24 to move past the straight line between points 26 and 28, thus inclining toggle arm 22 to the right of the axis of pin 28, whereupon spring 34 will snap the outer ends of toggle arm 21 and plunger 9 to the left, as shown in Figure 2, bringing channel 19 into register with both laterals 14, 15 and opening a passage through the piston to interconnect chambers C, whereupon the pressure in chambers C will be equalized. Some fluid will transfer from left hand chamber C through passages 16, 14, plug channel 19, passage 15, past spring check valve 36 and through passage 17 to the right hand chamber C, thereby building up a supply of fluid in the right hand chamber which will compensate for leakage or for wear of the parts actuated by the fluid discharged through outlet 5. As soon as piston 7 moves to the left far enough to shift pin 24 beyond the straight line between pivots 26 and 28, spring 34 will snap the toggle arms to their original relation shown in Figure 1 and shift plunger 9 to close laterals 14, 15 from each other. Ball and spring check 36 prevents the return of any fluid from right hand chamber C to left hand chamber C through the passage in the piston. Packing rings 38, 40 seal the relatively movable parts of the take-up against the passage of fluid between them.

The snap take-up insures adequate transfer of fluid, only when needed, from left hand chamber C to right hand chamber C and avoids "drifting" or "fluttering."

The travel of the parts and the width of the ports and of channel 19 do not provide the sole control for the timing of the valve opening and closing. This is determined by the movement of the piston relative to the cylinder and will always occur at the same points in the left hand travel and right hand travel respectively of the piston. The check valve 36 prevents back flow of the fluid so that once wear or other adjustment has induced discharge of additional fluid into right hand chamber C, it will remain there throughout successive brake applications.

The details of the structure may be varied without departing from the spirit of the invention and the exclusive use of those modifications coming within the scope of the claims is contemplated.

I claim:

1. A fluid pressure take-up comprising a cylinder, a piston therein, a pressure fluid inlet to the cylinder at one side of the piston, a pressure fluid outlet from the cylinder at the other side of the piston, there being a passage through the piston from one side to the other side, a valve normally closing said passage against inlet pressure fluid, means for moving said valve in one direction relative to the cylinder and piston when the pressure at the inlet side of the piston moves the latter past a predetermined point, said means moving said valve relative to the cylinder and piston in the opposite direction when the pressure fluid at the outlet side of the piston moves the latter past a predetermined point.

2. A fluid pressure take-up according to claim 1 in which the valve moving means includes a snap action device carried by the cylinder and piston and actuated to open the passage as the piston reaches a predetermined point in its first-mentioned movement to open said passage irrespective of continued movement of the piston in that direction, and actuated by the return movement of the piston past a predetermined point to close said passage irrespective of continued movement of the piston.

3. A fluid pressure take-up according to claim 1 in which the valve moving means includes toggle arms arranged end to end and having a common pivot on an end of the piston and diverging from each other with the outer end of one arm connected to said valve and with the outer end of the other arm connected to the cylinder, a spring between said arms and thrusting their ends toward each other at opposite sides of the axis of said pivot as the piston moves lengthwise of the cylinder.

4. A fluid pressure take-up comprising a cylinder, a piston therein, a pressure fluid inlet to the cylinder at one side of the piston, a pressure fluid outlet from the cylinder at the other side of the piston, there being a passage through the piston from one side to the other side, said passage including a portion elongated lengthwise of the piston and laterals leading opposite ends thereof and open respectively to said inlet and outlet parts of the cylinder, a plunger slidably fitting in said portion and provided with a recess in its periphery, said plunger being reciprocal in the piston to different positions to connect said recess to both of said laterals and to seal them from each other respectively, and a device between said plunger and the cylinder to shift said plunger in said passage portion as the piston moves along the cylinder.

5. A fluid pressure take-up according to claim 4 which includes an anchorage for the device to the cylinder which extends through a cylinder wall and is readily adjustable from the exterior of the cylinder to vary the relation between the piston movements and the shifting of the plunger in the piston.

6. A fluid pressure take-up according to claim 4, in which the device comprising a lever pivoted between its ends on the end of the piston and extending transversely of the piston axis with one arm connected to one end of said plunger, and a link connecting the other arm of the lever to the cylinder at a point spaced from said piston.

7. A fluid pressure take-up according to claim 4, in which said device comprising a toggle lever with its knee having a pivot on the end of the piston, one arm of the toggle lever extending from said pivot and secured at its outer end to said plunger, and the other arm of the toggle lever extending in a generally opposite direction from said knee with the outer end connected to the cylinder at a point spaced from the piston and plunger, and a spring connecting said arms and alternately yieldingly thrusting said plunger inwardly and outwardly of the piston, according to the relative position of the piston in the cylinder to provide a snap action for the plunger between lateral connecting and disconnecting positions.

8. A fluid pressure power operating cylinder and piston assembly characterized by a pressure fluid inlet at one end of the cylinder, a pressure fluid outlet at the other end of the cylinder, a fluid pressure passageway through the piston and leading to said inlet and outlet, a valve in said passageway, and spring means moving said valve in opposite directions relative to the cylinder and piston to open and close said passageway respectively when the piston moves past predetermined points in the cylinder.

References Cited in the file of this patent

UNITED STATES PATENTS 2,551,081     Alvarez                May 1, 1951

FOREIGN PATENTS 504,278     Great Britain          Apr. 19, 1939